No. 862,185. PATENTED AUG. 6, 1907.
W. W. McCALLIP.
MACHINE FOR FEEDING AND CUTTING WIRE OR OTHER MATERIAL.
APPLICATION FILED SEPT. 12, 1906.

3 SHEETS—SHEET 2.

Witnesses
Benj. Finckel
Alice B. Cook.

Inventor
William W. McCallip
By Finckel & Finckel
his Attorneys

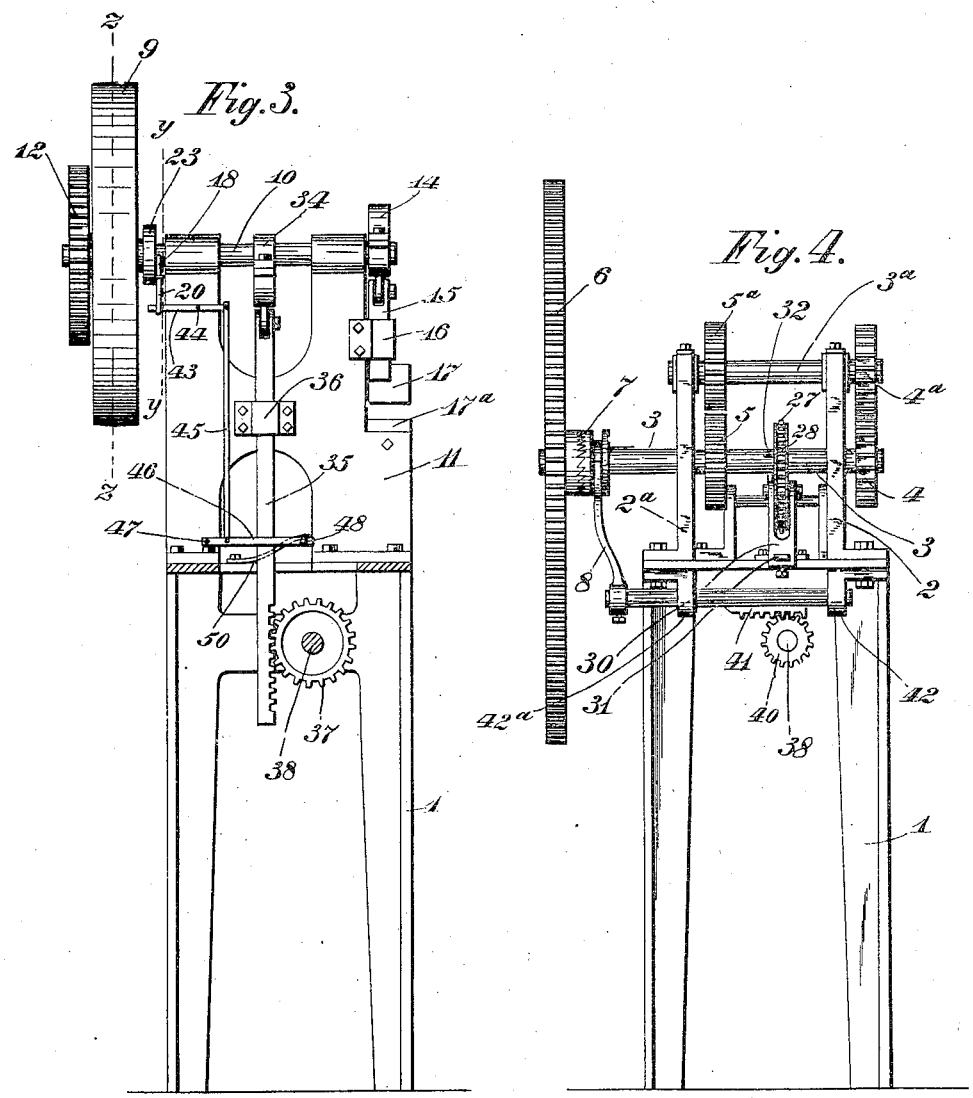

UNITED STATES PATENT OFFICE.

WILLIAM W. McCALLIP, OF COLUMBUS, OHIO.

MACHINE FOR FEEDING AND CUTTING WIRE OR OTHER MATERIAL.

No. 862,185.      Specification of Letters Patent.      Patented Aug. 6, 1907.

Application filed September 12, 1906. Serial No. 334,212.

*To all whom it may concern:*

Be it known that I, WILLIAM W. McCALLIP, a citizen of the United States, residing at Columbus, in the county of Franklin and State of Ohio, have invented a certain new and useful Improvement in Machines for Feeding and Cutting Wire or other Material, of which the following is a specification.

The object of this invention is to provide an improved machine for crimping or feeding a wire or strip and cutting it into sections, the feeding movement being interrupted during the cutting operation.

The invention is embodied in the construction hereinafter described and claimed, but it is not confined to the forms and proportions of parts particularly shown and described.

Figure 1:
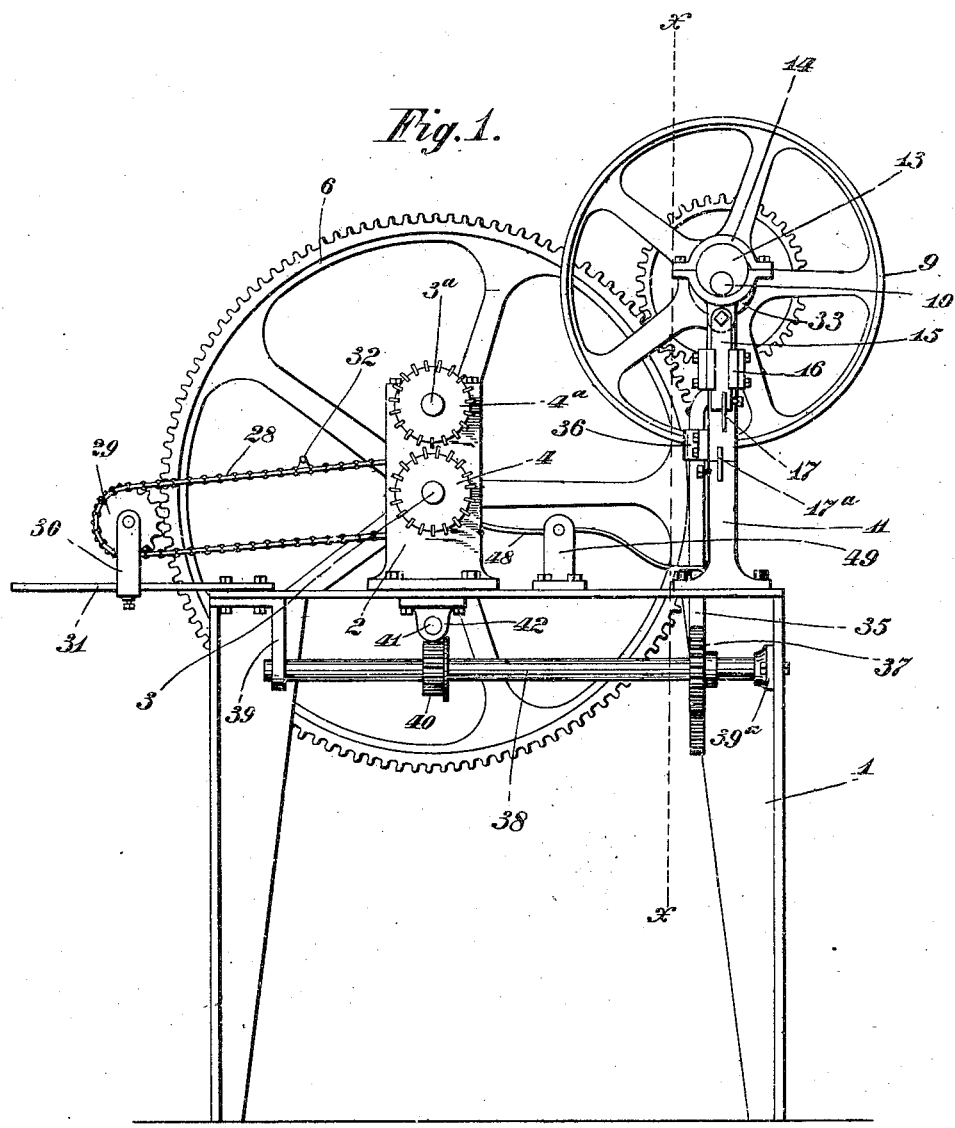
Figure 2:
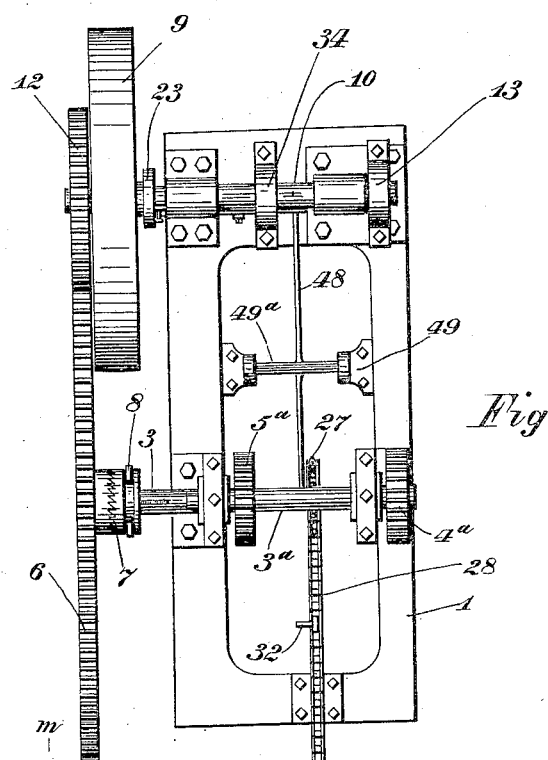
Figures 5, 6:
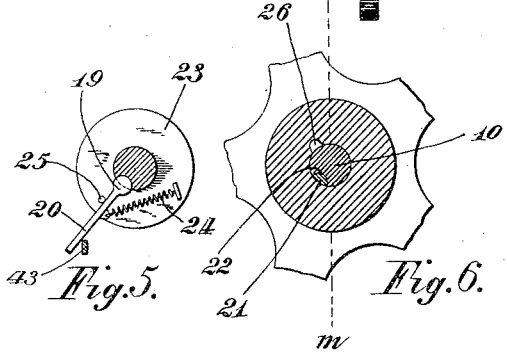
Figure 7:
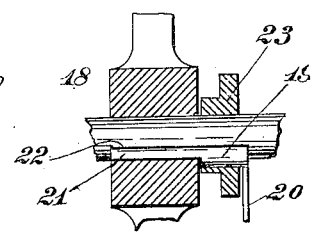

In the accompanying drawings—Figure 1 is a side elevation; Fig. 2 is a top plan view with parts omitted; Fig. 3 is a sectional view on the line $x-x$ of Fig. 1 looking towards the cutting mechanism; Fig. 4 is an end elevation of the left-hand end of the machine as seen in Fig. 1; Fig. 5 is a sectional view on the line $y-y$ of Fig. 3 showing parts of the clutching mechanism connected with the cutter operating shaft; Fig. 6 is a sectional view on the line $z-z$ of Fig. 3 with parts of the band wheel broken out, and also showing parts of the clutching mechanism connected with the cutter operating shaft; Fig. 7 is a sectional view on the line $m-m$ of Fig. 6 showing the cutter operating shaft and clutching key in full.

In the several views 1 designates a supporting frame having mounted on either side thereof standards 2 and $2^a$ in which are journaled shafts 3 and $3^a$, containing fixedly thereon the crimping and feeding rolls 4 and $4^a$. The shafts 3 and $3^a$ are coöperatively connected by means of gears 5 and $5^a$ and are driven by a large spur gear 6 loosely mounted on the shaft 3. A clutch 7 of a well-known form is provided for clutching the spur gear 6 and shaft 3, said clutch being provided as usual with an arm 8 connected with means for operating the clutch to be hereinafter described.

9 designates a band wheel through which motion is imparted to the machine, said band wheel being loosely mounted upon a shaft 10 journaled in a standard 11 at one end of the machine and having secured thereto a gear wheel 12 that engages and drives the spur gear 6. The shaft 10 is furnished with an eccentric 13 turning in a strap 14 to which is pivoted a cutter holder 15 slidably mounted in a guideway 16 on the standard 11. A cutting blade 17 secured in the cutter holder coöperates with a cutter bed $17^a$ to cut the wire after it passes through the crimping and feeding rolls.

18 designates a clutching device of well-known form and comprises, as is shown in Figs. 5, 6 and 7, a clutch key 19 provided with a lever arm 20 and a segmental portion 21 fitting in a groove 22 in the shaft 10. The character 23 designates a collar fixed to the shaft 10, the collar having fastened to it a spring 24 secured to the lever arm 20. In unclutched relation of the parts the segmental portion 21 of the clutch key is held flush in the groove 22 and against the action of a spring 24, by means of a pin 25 on the collar 23 and a lever arm 43 acting upon the key lever 20 to hold the same in engagement with said pin. The lever arm 43 will be hereinafter more particularly described. When the lever arm 20 is released by withdrawing the arm 43 the spring 24 tends to turn the clutch key in its groove in the shaft, so that when a groove 26 in the hub of the band wheel is reached the segmental portion of the key will be turned partly thereinto and lock the shaft 10 to the band wheel 9, whereupon the shaft 10 is rotated and the cutter operated. The shaft 10 is also provided with an eccentric 33 oppositely disposed on the shaft to the eccentric 13. The eccentric 33 works in a strap 34 to which is pivoted a rack bar 35 sliding in a guideway 36 secured to the standard 11. The rack bar 35 engages a pinion 37 mounted on a shaft 38 that is journaled in brackets 39 and $39^a$ longitudinally of the frame and below the top thereof. The shaft 38 is also provided with a pinion 40 that engages a rack bar 41 sliding transversely the frame in brackets 42 and $42^a$. The arm 8 of the clutch member 7 is secured to the end of the rack bar 41 and is operated thereby to actuate said clutch.

The means for actuating the clutch 18 of the cutter operating shaft 10 comprises a horizontally extended arm 43 pivoted at 44 to the standard 11, and normally engaging the key arm 20. A vertically extending arm 45 is pivoted to the arm 43 and also to an arm 46, which arm 46 is also pivoted at 47 to the base of the standard 11 and has connected thereto a rocking arm 48 suitably supported on brackets 49 and $49^a$. The free end of the arm 48 extends beneath the shaft 3 and into the path of a striker to be hereinafter described. A spring 50 secured to the frame and bearing upon the end of the rocking arm 48 operates to elevate the free end of said arm and therefore hold the lever arm 43 normally in engagement with the key arm 20, thus correspondingly maintaining the clutch 18 in inactive position.

27 designates a sprocket wheel fixed to the shaft 3. This sprocket wheel 27 carries a sprocket chain 28 that also engages a sprocket wheel 29 journaled in a standard 30 adjustable on a rod 31 extending from the frame 1. The sprocket wheel 29 is made adjustable to provide for different lengths of chain and for taking up slack in the chain. The sprocket chain is provided with a striker 32 arranged to periodically strike the free end of the rocking arm 48 and thus actuate the levers connected with the clutch 18.

In operating the machine, power is applied through the band wheel 9 and gear 12 to the large spur gear 6 which, as before indicated, is normally engaged with the shaft 3 and drives the same and the crimping wheels geared therewith. The sprocket wheels 27 and 29 and the sprocket chain thereon are also driven and the striker 32 is carried around and strikes the free end of the lever 48, and depresses the same, thereby elevating the lever arms 46 and 45 and depressing the end of the lever arm 43 engaging the clutch key arm 20 and releasing said clutch key arm. The spring 24 then operates to force the clutch key into the groove 26 in the hub of the band wheel and thus clutch the band wheel to the shaft 10, whereupon the shaft turns and actuates the rack-bar 35 to rotate the pinion 37 and its shaft 38. The pinion 40 on the shaft 38 is also rotated and actuates the rack-bar 41 to release the clutch 7 and thereby stop the shaft 3 and the crimping wheels through which wire has been fed. The wire may be taken from a spool or reel not shown. When the shaft 10 is rotated and the movement of the crimping and feeding wheels interrupted, as above described, the eccentric 13 is also operated to actuate the cutter 17. It will thus be seen that during the cutting operation the movement of the wire through the machine is interrupted, and buckling of the wire between the crimpers and cutters is avoided. It will also be seen that, by reason of the fact that the wire is interrupted during the cutting operation, a simple form of reciprocating cutter can be employed and the cutter blades readily replaced when they become injured or worn.

What I claim and desire to secure by Letters Patent is:

1. In a machine for dividing strips into pieces, a feeding device, a cutting device, driving shafts for said devices, driving gear for said shafts, a spring-actuated clutch for the cutter device shaft and said driving gear, a lever engaging said clutch, a rocking arm connected with the said lever, a spring acting upon said lever to hold said clutch in inoperative position, a driven object adapted to periodically strike said rocking arm to release said lever from engagement with said clutch, a clutch for the feeding device shaft, means for controlling said clutch whereby the feeding device is normally operative, and means for releasing the said feeding device clutch simultaneously with the clutching of the cutter device shaft.

2. In a machine for dividing strips into pieces, a feeding device, a cutting device, driving shafts for said devices, gearing for operating said shafts, a clutch for the cutter device shaft, means for controlling said clutch whereby the cutting device is normally inoperative, means for periodically actuating said clutch to operate the cutter device, a clutch for the feeding device shaft and means for maintaining said clutch normally in clutched position, a rack-bar connected with said clutch, a shaft and pinion thereon engaging said rack-bar, a second pinion on said shaft and a rack-bar engaging the same, and an eccentric on the cutter operating shaft for operating said last mentioned rack-bar whereby the clutch for the feeding device shaft is released and the operation of the feeding device interrupted during the operation of the cutter device.

3. In a machine for dividing strips into pieces, a feeding device, a cutting device, driving shafts for said devices, driving gear for said shafts, a clutch for the cutter device shaft and said driving gear, means for controlling said clutch whereby the cutting device is normally inoperative, a rocking arm connected with said clutch, a spring acting upon said rocking arm to hold the clutch in inoperative position, sprockets and sprocket chain thereon driven by said feeding device shaft, a striker on said sprocket chain, the said rocking arm having a free end lying in the path of said striker and adapted to be struck periodically thereby to operate the cutter shaft clutch, a clutch for the feeding device shaft, means for controlling said clutch whereby the feeding device is normally operative, and means for releasing the clutch of the feeding device shaft simultaneously with the clutching of the cutter device shaft.

4. In a machine for dividing strips into pieces, the combination of a main driving shaft, feeding and cutting mechanisms adapted to be driven by said shaft, clutches for intermittently connecting the feeding and cutting mechanisms with said shaft, a trip for actuating the cutting mechanism clutch, a striker geared to said shaft and adapted to periodically actuate said trip, and gearing connecting the cutting mechanism and the clutch for feeding mechanism whereby the actuation of the cutting mechanism unclutches the feeding mechanism from said shaft.

WILLIAM W. McCALLIP.

Witnesses:
BENJAMIN FINCKEL,
GEORGE M. FINCKEL.